(12) United States Patent
Barton et al.

(10) Patent No.: US 12,549,576 B2
(45) Date of Patent: Feb. 10, 2026

(54) SECURITY POLICY ADJUSTMENT BASED ON ANOMALY DETECTION

(71) Applicant: Cisco Technology, Inc., San Jose, CA (US)

(72) Inventors: Robert Edgar Barton, Richmond (CA); Bhavik Pradeep Shah, Bangalore (IN); Thomas Szigeti, Vancouver (CA); Nancy Patricia Cam-Winget, Mountain View, CA (US); Edward Albert Warnicke, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 18/128,978

(22) Filed: Mar. 30, 2023

(65) Prior Publication Data

US 2024/0333734 A1    Oct. 3, 2024

(51) Int. Cl.
*H04L 9/40* (2022.01)
*H04L 41/0631* (2022.01)

(52) U.S. Cl.
CPC ........ *H04L 63/1425* (2013.01); *H04L 41/065* (2013.01)

(58) Field of Classification Search
CPC ................ H04L 63/1425; H04L 41/065
See application file for complete search history.

(56) References Cited

U.S. PATENT DOCUMENTS

| 12,346,468 | B1* | 7/2025 | Smith ............... G06F 21/6218 |
| 2013/0097709 | A1* | 4/2013 | Basavapatna ....... H04L 63/1425 726/25 |
| 2019/0028504 | A1* | 1/2019 | Shtar ................ H04L 63/1425 |
| 2019/0236249 | A1 | 8/2019 | Pavlou et al. |
| 2020/0120141 | A1 | 4/2020 | Joseph et al. |
| 2020/0351285 | A1 | 11/2020 | Eisenkot et al. |
| 2021/0103461 | A1* | 4/2021 | Esibov .................. G06F 21/32 |
| 2022/0103597 | A1 | 3/2022 | Gobena et al. |
| 2022/0121995 | A1 | 4/2022 | Chari et al. |
| 2022/0286472 | A1* | 9/2022 | Khalil ............... H04L 63/1425 |
| 2023/0231854 | A1* | 7/2023 | Blake ................ H04L 63/1425 726/4 |

OTHER PUBLICATIONS

Valero, et al., "Improving the Security and QoE in Mobile Devices through an Intelligent and Adaptive Continuous Authentication System," Sensors 2018, 18(11), 3769, Nov. 2018, pp. 1-29.

* cited by examiner

*Primary Examiner* — Patrice L Winder
(74) *Attorney, Agent, or Firm* — Lee & Hayes, P.C.

(57) ABSTRACT

This disclosure describes techniques for escalating a security policy based on anomalous behavior. An example method includes identifying first behaviors associated with a first user and identifying a cluster comprising the first behaviors and second behaviors associated with at least one second user. The first user and the at least one second user are within a predetermined group within an organization. The example method further includes determining that a third behavior of a device associated with the first user is greater than a threshold distance from the cluster and outputting an alert.

20 Claims, 5 Drawing Sheets

SECURITY POLICY ADJUSTMENT BASED ON ANOMALY DETECTION

TECHNICAL FIELD

The present disclosure relates generally to detecting behavioral anomalies associated with devices within a computing network and adjusting security policies for the devices based on the behavioral anomalies.

BACKGROUND

Organizations protect various important data and other computing resources using authentication systems. Authentication systems generally focus on verifying whether the user requesting access to a secured resource is indeed an authorized user. For example, an example system may use these techniques provide a device associated with an employee with access to a secured resource and may deny a device associated with a non-employee with access to the secured resource.

The device associated with the employee, however, can be compromised. To prevent malicious users from gaining access to the secured resource by controlling the device associated with the employee, the authentication system may trigger reauthentications in order to confirm the identity of the individual utilizing the device.

Authentications and reauthentications, however, can be distracting and irritating to employees. An authentication or reauthentication, for instance, may interrupt the user's workday by requiring the user to input one or more authentication factors (e.g., a password, a confirmation of a push notification, etc.) in order to access the secured resource. Due to the friction associated with authentication and reauthentication, efforts have been developed to dynamically adjust an authentication process based on the behavior of the device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
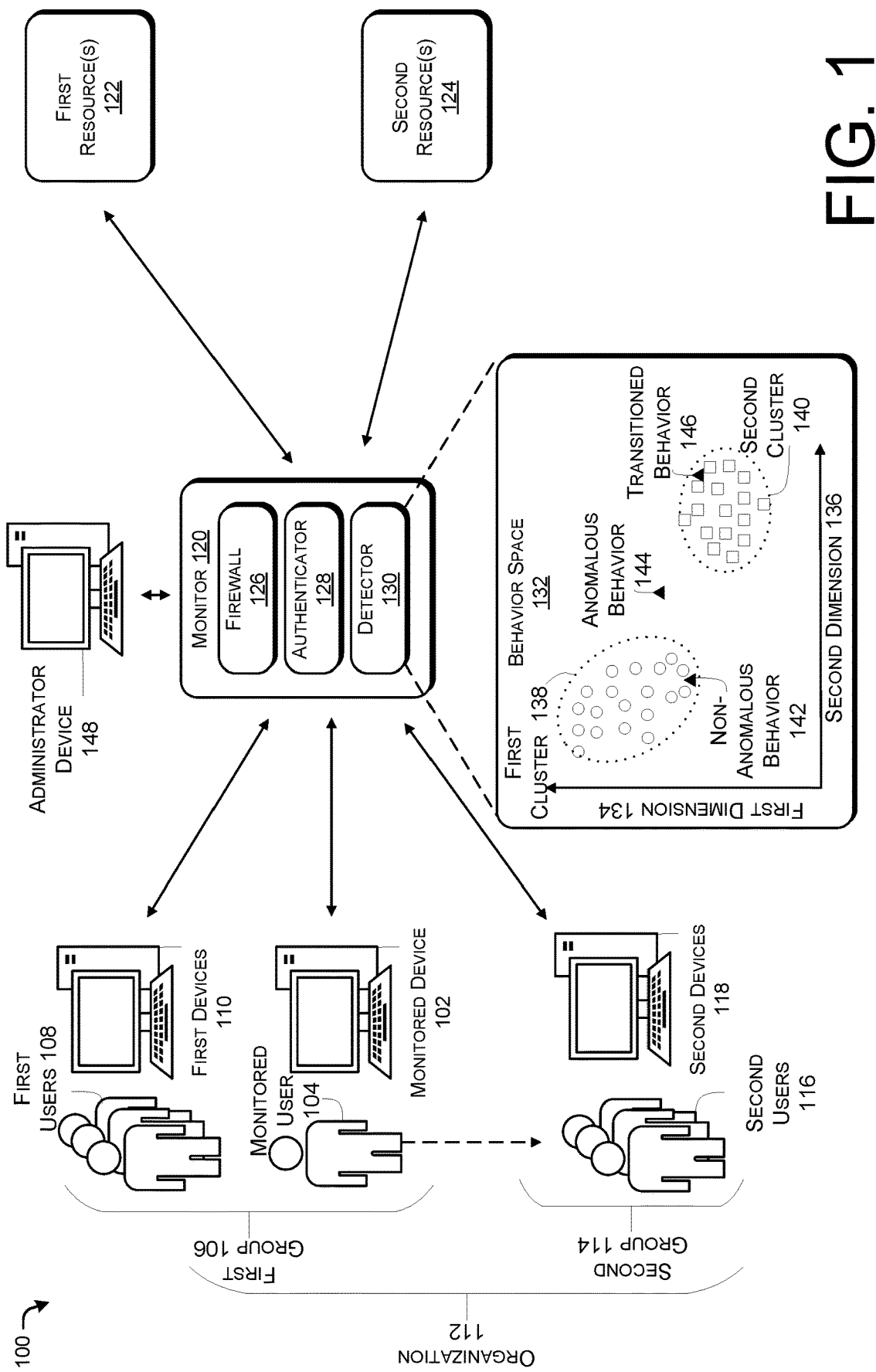
FIG. 1 illustrates an example environment for adjusting security policies based on user behavior.

This disclosure describes various techniques for alerting to anomalous behavior of a device. An example method includes identifying first behaviors associated with a first user and identifying a cluster comprising the first behaviors and second behaviors associated with at least one second user. The first user and the at least one second user are within a predetermined group within an organization. The example method further includes determining that a third behavior of a device associated with the first user is greater than a threshold distance from the cluster; and based on determining that the third behavior is greater than the threshold distance from the cluster, outputting an alert.

In some examples, the device is a first device and the first behaviors include at least one of a request to access first data in a first resource; a request to modify second data in a second resource; a transmission of third data from the first device to a second device; or a receipt of fourth data from the second device to the first device.

In some implementations, the device is a first device, wherein identifying the first behaviors associated with the first user is performed by an in-line monitor and includes: receiving, from the first device and by the in-line monitor, a request to access or modify data stored by a second device. According to various cases, the in-line monitor may be a zero trust service, a cloud access security broker (CASB), a secure access service edge (SASE) service, a network security service, or a proxy. The in-line monitor, for instance, is a network node disposed on a path between the first device and the second device.

In some cases, determining that the third behavior is greater than the threshold distance from the cluster includes identifying a distance between the third behavior and a center or boundary of the cluster; and determining that the distance is greater than the threshold distance.

According to various examples, the cluster is a first cluster, the predetermined group is a first predetermined group, the alert is a first alert, and the method further includes: identifying a second cluster comprising fourth behaviors associated with third users, the third users being in a second predetermined group within the organization; determining that at least one fifth behavior associated with the device is greater than the threshold distance from the first cluster; determining that the at least one fifth behavior associated with the device is within the second cluster; and based on determining that the at least one fifth behavior associated with the device is within the second cluster, refraining from outputting an alert. The method may further include outputting a notification indicating that the first user has transitioned from the first predetermined group to the second predetermined group.

EXAMPLE EMBODIMENTS

This disclosure describes various techniques for selectively escalating or deescalating a security policy associated with a device based on determining whether the device, or the user operating the device, is operating anomalously. In various implementations, behavior associated with a device is compared to a cluster of previous behaviors of the authorized user and/or other, similarly situated users in an organization. In some cases, the authorized user and the other users one of multiple groups in the organizations. The group may be predefined (e.g., users working out of the same office) or may be defined based on behavioral similarity. Thus, in some cases, individuals within the organization may be compared to other individuals in their group, rather than to the organization as a whole.

A security policy (e.g., a firewall policy, a multi-factor authentication (MFA) policy, or the like) may be adjusted based on a distance between the cluster and the behavior associated with the device. In various cases, a monitor can determine how anomalous the behavior is based on the distance to the cluster. Anomalous behavior may indicate that the device has been compromised by an unregistered (e.g., malicious) user. Thus, the monitor may increase the stringency of the security policy based on the distance.

Implementations of the present disclosure provide several advantages. The monitor can be implemented on an in-line monitor between the monitored device and the secured resource, rather than as a client on the monitored device itself. Thus, in some cases, the monitor can be implemented without downloading or installing specialized software on the monitored device.

In various cases, expected behavior of respective groups in the organization can be defined by multiple clusters within a behavior space. In some implementations of the present disclosure, the monitor can proactively detect when a device or user has moved from a first cluster to a second cluster in the behavior space. Thus, when the user has changed their role or behavior within the organization, the monitor may refrain from escalating the security policy.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for adjusting security policies based on user behavior. The environment 100 includes a monitored device 102 utilized by a monitored user 104. The monitored device 102, for instance, is a computing device. As used herein, the term "computing device," and its equivalents, can refer to a device that includes one or more processors configured to perform operations. In various cases, a computing device further includes memory configured to store instructions that are executed by the processor(s). In some implementations, the monitored device 102 is a type of user equipment. As used herein, the terms "UE," "user device," "wireless communication device," "communication device," "mobile device," "client device," and "terminal" can be used interchangeably herein to describe any UE that is capable of transmitting/receiving data (e.g., wirelessly) using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over Internet Protocol (IP) (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology. In general, a UE can be implemented as any suitable type of computing device configured to communicate over a wired or wireless network, including, without limitation, a mobile phone (e.g., a smart phone), a tablet computer, a laptop computer, a Portable Digital Assistant (PDA), a wearable computer (e.g., electronic/smart glasses, a smart watch, fitness trackers, etc.), an Internet-of-Things (IoT) device, an in-vehicle (e.g., in-car) computer, and/or any similar mobile device, as well as situated computing devices including, without limitation, a television (smart television), a Set-Top-Box (STB), a desktop computer, and the like.

In various implementations, the monitored user 104 is part of a first group 106 that includes first users 108. The first users 108 respectively utilize first devices 110. The first group 106 is part of a broader organization 112. In various cases, the organization 112 is a company, enterprise, workplace, department, government, or other group of individuals. In some cases, the first users 108 in the first group 106 share at least some behavioral patterns. For instance, the first users 108 in the first group 106 work within the same office building, floor, city, region, or country. In some cases, the first users 108 in the first group 106 share the same language. In certain cases, the first users 108 in the first group 106 are in the same department, or share the same type of role (e.g., software engineers) within the organization 112. The first users 108 may share other characteristics. For instance, the first users 108 may have graduated from the same school, have similar hobbies, watch similar sports, send their children to the same school, or the like. In various implementations, the first users 108 interact with the first devices 110 similarly. For instance, the first users 108 may use the first devices 110 to access files from similar locations, visit the similar websites, and at similar times-of-day.

The organization 112 may also include a second group 114. The second group 114 includes second users 116 that utilize second devices 118. The second users 116 within the second group 114 may behave similarly. For example, the second users 116 may work within the same office building, floor, city, region, or country. The second users 116 may speak the same language. In some cases, the second users 116 may be in the same department, or share the same type of role (e.g., marketing executives) within the organization 112. In some cases, the second users 116 may have graduated from the same school, have similar hobbies, watch similar sports, send their children to the same school, or the like. In various cases, the second users 116 interact with the second devices 118 similarly.

In various cases, although the first group 106 and the second group 114 are part of the same organization 112, the first group 106 and the second group 114 may behave differently. In some cases, the first group 106 and the second group 114 work in different offices within the organization 112. In some examples, the first group 106 and the second group 114 are in different departments or business units of the organization 112. In various instances, the first group 106 is defined as individuals with the same role (e.g., software developers) within the organization 112, and the second group 106 is defined as individuals with a different role (e.g., marketing executives) within the organization 112.

A monitor 120 is communicatively coupled to the devices associated with the organization 112, such as the monitored device 102, the first devices 110, and the second devices 118. In various cases, the monitor 120 is separate from the monitored device 102, the first devices 110, and the second devices 118. Accordingly, the monitor 120 may be implemented without installing specialized agents or software on the monitored device 102, the first devices 110, and the second devices 118. In some implementations, the monitor 120 is implemented on one or more server computers that are located remotely from the monitored device 102, the first devices 110, and the second devices 118.

In various implementations, the monitor 120 intercepts or otherwise is disposed in-line with various data flows associated with the monitored device 102, the first devices 110, and the second devices 118. The monitor 120 may include hardware, software, or both. As used herein, the terms "flow," "data flow," and their equivalents, may refer to data being transmitted along a path that includes one or more network nodes. Data flows may be unidirectional and/or bidirectional. As used herein, the terms "node," "network node," and their equivalents, can refer to any entity within a network that can transmit packets to and/or receive packets from at least one other node. A node may be a device, a software instance, a Virtual Machine (VM), a container, a virtual process, or the like. In some examples, a node may include a grouping of devices or virtual resources, such as security groups, subnetworks, and so forth. In some examples, a node can be a client, a server, or a combination thereof. In some cases, a node can be a network switch, network router, or the like.

A data flow may include a transmission of data from a first network node (a first endpoint or "source") to a second network node (a second endpoint or "destination"). In some cases, a data flow is transmitted to multiple destinations. In particular cases, the monitored device 102, the first devices 110, and the second devices 118 are endpoints of the data flows. Further, a data flow may be transmitted between endpoints by one or more intermediary network nodes. The data flow, for example, is transmitted along a path that includes the endpoints and optionally, one or more intermediary nodes that transmit the data between the endpoints. In various implementations, the monitor 120 is included in a zero trust service, a cloud access security broker (CASB), a secure access service edge (SASE) service, a network security service, or a proxy.

The environment 100 additionally includes at least one first resource 122 and at least one second resource 124. The first resource(s) 122 and the second resource(s) 124 may also be endpoints in the data flows. The first resource(s) 122 and the second resource(s) 124 may be implemented as hardware, software, or both. For example, the first resource(s) 122 and the second resource(s) 124 may include computing devices (e.g., servers, IoT devices, sensors, mobile devices, etc.), virtual machines, databases, and the like. The monitor 120 may be in-line with the data flows between any combination of the monitored device 102, the first devices 110, the second devices 118, the first resource(s) 122, and the second resource(s) 124. Thus, data traversing the data flows may be observed by the monitor 120. The monitor 120, for example, is an intermediary node for data flows that originate and/or terminate at the monitored device 102, the first devices 110, and the second devices 118.

In various implementations, the monitor 120 is configured to implement one or more security policies on the data flows. As used herein, the term "security policy," and its equivalents, may refer to a set of security rules (e.g., triggers) and/or actions to prevent damage or exposure of data associated with a computer network.

The monitor 120, for instance, may include a firewall 126. The firewall 126 may be configured to selectively block data between the endpoints based on one or more security rules. For example, the firewall 126 may be configured to block data in a data flow based on one or more conditions. In various implementations, the firewall 126 is disposed between the devices of the organization 112 and one or more public networks, such as the Internet. In some cases, the firewall 126 is disposed between the devices of the organization 112 and one or more secured resources. The secured resources, for instance, may store sensitive data, such as financial information, personal information, trade secrets of the organization 112, or the like.

In some cases, the monitor 120 includes an authenticator 128. The authenticator 128, in various implementations, may be configured to authenticate the monitored device 102, the monitored user 104, the first users 108, the first devices 110, the second users 116, and the second devices 118. In some implementations, the authenticator 128 performs multi-factor authentication (MFA). As used herein, the terms "multi-factor authentication," "MFA," and their equivalents, can refer to a process of confirming that a device, the identity of a user of the device, or both, are authorized by requesting and receiving at least two authentication factors from the device, the user, and/or one or more additional devices associated with the user. A user or device is "authorized" when they have permission to access a secure resource. When compared to single-factor authentication, MFA is more likely to successfully authenticate an authorized user or device and to successfully deny an unauthorized user or device. An example MFA process includes requesting a first authentication factor; based on receiving the first authentication factor, requesting a second authentication factor; and based on receiving the second authentication factor, enabling access to a secured resource. The first authentication factor and/or the second authentication factor can be received from a single device or multiple devices associated with the same user. In some cases described herein, the authentication system 108 attempts to confirm one or more authentication factors without specifically requesting them from a user.

In various cases, the authenticator 128 performs repeated and/or periodic authentications referred to as "reauthentication." A time period that separates multiple authentications of the same entity may be referred to as a "reauthentication interval." According to various implementations, the authenticator 128 may be configured to trigger a reauthentication and/or alter a reauthentication process for a given entity (e.g., change a type of authentication factor requested, change a number of authentication factors requested, change a number of devices requested to participate in the authentication for a given user, or change a reauthentication interval) based on one or more conditions.

According to various implementations of the present disclosure, the monitor 120 further includes a detector 130 configured to detect whether one or more conditions associated with a security policy has been satisfied. For instance, if the detector 130 detects that a particular condition has been satisfied, the firewall 126 may block data in a corresponding data flow and/or the authenticator 128 may trigger a reauthentication and/or alter an authentication process for the corresponding entity.

In various cases, the detector 130 is configured to detect anomalous behavior. As used herein, the term "anomalous," and its equivalents, may refer to a characteristic of behavior that diverges from an expected class of behaviors. As used herein, the term "behavior," and its equivalents, may refer to an action performed by an individual or a device. For example, a behavior may refer to an attempt to access and/or modify data stored in a database, server, or the like. The detector 130, for instance, tracks behaviors indicated by data flows to or from the monitored device 102, the first devices 110, and the second devices 118. The detector 130 may learn what types of behaviors are normal for the monitored device 102, the first devices 110, and the second devices 118. Further, the detector 130 may determine what types of behaviors are abnormal (e.g., anomalous) for the monitored device 102, the first devices 110, and the second devices 118.

Various types of anomaly detection strategies can be applied by the detector 130. In some cases, the detector 130 uses correlation-based outlier detection, tensor-based outlier detection, support vector machines, neural networks, auto-encoders, Bayesian networks, hidden Markov models (HMMs), k-nearest neighbor, isolation forests, cluster-based analysis, or any combination thereof, to detect anomalous behavior.

In particular cases, the detector 130 models behaviors associated with the first group 106 and the second group 114 in a behavior space 132. The behavior space 132 illustrated in FIG. 1 has a first dimension 134 and a second dimension 136, although implementations are not so limited. In some cases, the behavior space 132 has n dimensions, wherein n is an integer greater than 1. However, as an example, the behavior space 132 in FIG. 1 will be described with two dimensions.

According to various implementations, the detector 130 identifies a first cluster 138 that includes first behaviors (represented by circles) of the first group 110. In addition, the detector 130 identifies a second cluster 140 that includes second behaviors (represented by squares) of the second group 114. In some implementations, the first group 106 and the second group 114 are predefined, such that the first cluster 138 and the second cluster 140 are defined based on the first behaviors of the predetermined first group 106 and the second behaviors of the second group 114. In some cases, the first group 106 and the second group 114 are defined based on the first cluster 138 and the second cluster 140. For instance, the detector 130 may plot behaviors from all individuals within the organization 112, may identify natural clusters of those behaviors using a clustering technique, define the first group 106 as individuals whose behaviors are within the first cluster 138, and define the second group 114 as individuals whose behaviors are within the second cluster 140. In various implementations, the detector 130 performs supervised, unsupervised, or semi-supervised clustering. In some cases, the detector 130 performs k-means clustering to identify the first cluster 138 and the second cluster 140.

The detector 130, in some cases, determines whether a behavior is anomalous by comparing the behavior to the first cluster 138 and the second cluster 140 in the behavior space 132. For instance, a behavior of an individual within the first group 106 is defined as anomalous if it is greater than a threshold distance from a boundary or geometric center of the first cluster 138. Similarly, a behavior of an individual within the second group 114 is defined as anomalous if it is greater than a threshold distance from a boundary or geometric center of the second cluster 138. In some cases, the threshold distance to define anomalies with respect to the first cluster 138 is different than the threshold distance to define anomalies with respect to the second cluster 140. For instance, the threshold distance used to evaluate behavior with respect to a given cluster may be proportional to the radius of the cluster. In a particular case, the first cluster 138 may have a larger radius than the second cluster 140, such that a behavior of an individual in the first group 106 will be compared to a first threshold distance from the first cluster 138 an dan individual in the second group 114 will be compared to a second threshold distance from the second cluster 140, the first threshold distance being longer than the second threshold distance.

In some cases in which the monitored user 104 is defined as being a part of the first group 106, behaviors of the monitored device 102 and/or monitored user 104 (illustrates as triangles) are compared to the first cluster 138. For instance, a non-anomalous behavior 142 is categorized as non-anomalous because it is within the first cluster 138. In contrast, an anomalous behavior 144 is categorized as anomalous because it is greater than a threshold distance from the first cluster 138.

In various implementations, the behaviors of the first group 106 and the second group 114 are compared to different clusters, even though they are part of the same organization 112. In various cases, what constitutes normal behavior for individuals in the first group 106 may be abnormal behavior for individuals in the second group 114, and vice versa. For instance, it may be abnormal for the first group 106 to access the second resource(s) 124 during a particular time-of-day (e.g., mornings), but may be normal for the second group 116 to access the second resource(s) 124 during the particular time-of-day. If a malicious user operating the monitored device 102 attempted to access the second resource(s) 124 during the particular time-of-day, that behavior would erroneously be flagged as normal if it was compared to a cluster representing the first behaviors of the first group 106 and the second behaviors of the second group 114. However, in various implementations of the present disclosure, such a behavior could be marked as anomalous if it was compared to the first cluster 138. Accordingly, implementations of the present disclosure can enable more precise anomaly detection of behaviors from individuals within the organization 112.

In some implementations, the distance of behaviors to the clusters is used to proportionally scale a strictness of a security policy. For example, the firewall 126 may be more likely to block data to and from the monitored device 102 based on magnitude of the distance between the anomalous behavior 144 and the first cluster 138. In some cases, the authenticator 128 may scale a reauthentication interval for the monitored device 102 to be inversely proportional to the distance of the anomalous behavior 144 to the first cluster 138 in the behavior space 132. According to some instances, a number of authentication factors requested by the authenticator 128 is proportional to the distance between the anomalous behavior 144 and the first cluster 138. Thus, in various cases, a security policy for the monitored device 102 can be proportionally scaled based on n dimensional representations of the anomalous behavior 144 within the behavior space 132.

Individuals within the organization 112 may move between different groups. This may result in a change in normal behaviors for the individuals. For example, a change in the role of the monitored user 104 within the organization 112 may cause the monitored user 104 to more appropriately be modeled to the second group 114, rather than the first group 106. However, if the detector 130 continues to compare the behavior of the monitored user 104 to the first cluster 138 after the monitored user 104 has transitioned to the second group 114, then the detector 130 may unnecessarily escalate a security policy of the monitored device 102 despite the monitored user 104 practicing normal behavior for the second group 114. In some cases, the detector 140 may be unable to detect anomalous behavior of a malicious user using the monitored device 102, if the malicious user is behaving similarly to the first group 106 after the monitored user 104 has moved to the second group 114.

In various implementations of the present disclosure, the detector 130 may determine that the monitored user 104 has left the first group 106 and has joined the second group 114, based on the behaviors of the monitored user 104. For instance, the detector 130 may detect that the monitored user 104 has joined the second group 114 by determining that at least one transitioned behavior 146 of the monitored user 104 is within the second cluster 140. In some cases, the detector 130 determines that a threshold number of transitioned behaviors 146 are within the second cluster 140 before concluding that the monitored user 104 has transitioned to the second group 114.

Once the detector 130 determines that the monitored user 104 has transitioned to the second group 114, the detector 130 may compare subsequent behaviors of the monitored device 102 to the second cluster 140, rather than the first cluster 138. In various implementations, this may prevent the detector 130 from incorrectly labeling the behavior of the monitored user 104 has anomalous and/or non-anomalous. Accordingly, the firewall 126 and the authenticator 128 may be prevented from unnecessarily restricting access of the monitored device 102 and/or initiating unnecessary authentication of the monitored device 102 and/or the monitored user 104.

In various cases, the monitor 120 is further communicatively coupled to an administrator device 148. For instance, the administrator device 148 is a computing device utilized by a security administrator for the organization 112. In some cases, the monitor 120 outputs alerts and other messages to the administrator device 148. For example, the monitor 120 may output an alert indicating an anomalous behavior detected by the detector 130. In some cases, the monitor 120 outputs a message indicating that a user has joined a different group, such as a message indicating that the monitored user 104 has transitioned from the first group 106 to the second group 114. Thus, the security administrator may be informed of security risks and other events within the organization 112.

A particular example will now be described with respect to FIG. 2. In this example, the first group 106 of the organization 112 may be individuals operating out of an office in Los Angeles and the second group 114 may be individuals operating out of an office in London. For example, the first group 106 is responsible for developing hardware for the organization 112, whereas the second group 114 is responsible for developing software for the organization 112.

In various cases, the first devices 110 utilized by the first group 106 regularly access data stored in the first resource(s) 122. For example, the data stored in the first resource(s) 122 may include circuit diagrams, blueprints, and other records associated with the development of the hardware. The first devices 110 access this data during regular business hours in Los Angeles. Various access requests for the data (e.g., transmitted by the first devices 110 toward the first resource (s) 122) may be intercepted by the monitor 120 and plotted within the behavior space 132. The first cluster 138 may represent these behaviors.

In contrast, the second devices 118 utilized by the second group 114 regularly access data stored in the second resource(s) 124. For example, the data stored in the second resource(s) 124 may include software development resources hosted on one or more web servers. The second devices 118 regularly access the data stored in the second resource(s) 124 during regular business hours in London. Various access requests for the data (e.g., transmitted by the second devices 118 toward the second resource(s) 124) may be intercepted by the monitor 120 and plotted within the behavior space 132. The second cluster 140 may represent these behaviors.

In various cases, the first group 106 has a different behavior pattern than the second group 106. For example, the first devices 110 may have no history of accessing the second resource(s) 124 or accessing the first resource(s) 122 outside of regular business hours in Los Angeles. Further, the second devices 118 may have no history of accessing the first resource(s) 122 or accessing the second resource(s) 124 outside of regular business hours in London. As a result, the first cluster 138 may be non-overlapping and separate from the second cluster 140.

The monitored user 104 is, at least initially, a part of the first group 106. However, if a malicious user gains control of the monitored device 102, the malicious user may request data in the first resource(s) 122 outside of normal business hours in Los Angeles. In various implementations, the monitor 130 detects this anomalous behavior by comparing the requests to the first cluster 138. For instance, a request for the first resource(s) 122 outside of normal business hours in Los Angeles may represent the anomalous behavior 144 illustrated in FIG. 1. In some cases, upon detecting the anomalous behavior 144, the detector 130 causes the firewall 126 to block the monitored device 102 form accessing the first resource(s) 122. In some examples, upon detecting the anomalous behavior 144, the detector 130 causes the authenticator 128 to escalate a reauthentication policy for the monitored device 102. For instance, the authenticator may automatically trigger a reauthentication of the monitored device 102. Thus, the malicious user may be prevented from accessing the first resource(s) 122 using the monitored device 102.

However, in another example, the monitored user 104 may be tasked with working with the second group 114. Due to this collaboration, the monitored user 104 may begin working during regular business hours in London, rather than Los Angeles. Further, the monitored user 104 may begin accessing the second resource(s) 124, rather than the first resource(s) 122. In various cases, the detector 130 may recognize that the behavior of the monitored user 104 has fallen into the second cluster 140. For example, the behavior of the monitored user 104 may be the transitioned behavior 146. Even though the transitioned behavior 146 may be relatively distant from the first cluster 138, the detector 130 may proactively determine that the monitored user 104 has joined the second group 114, and may refrain from escalating a security policy of the monitored device 102 based on the distance between the transitioned behavior 146 and the first cluster 138. In some cases, the monitor 120 may output a message to the administrator device 148 indicating that the monitored user 104 has moved from the first group 106 to the second group 114. Thus, the administrator may have an accurate understanding of the members of the first group 106 and the second group 114 within the organization 112.

Figure 2:
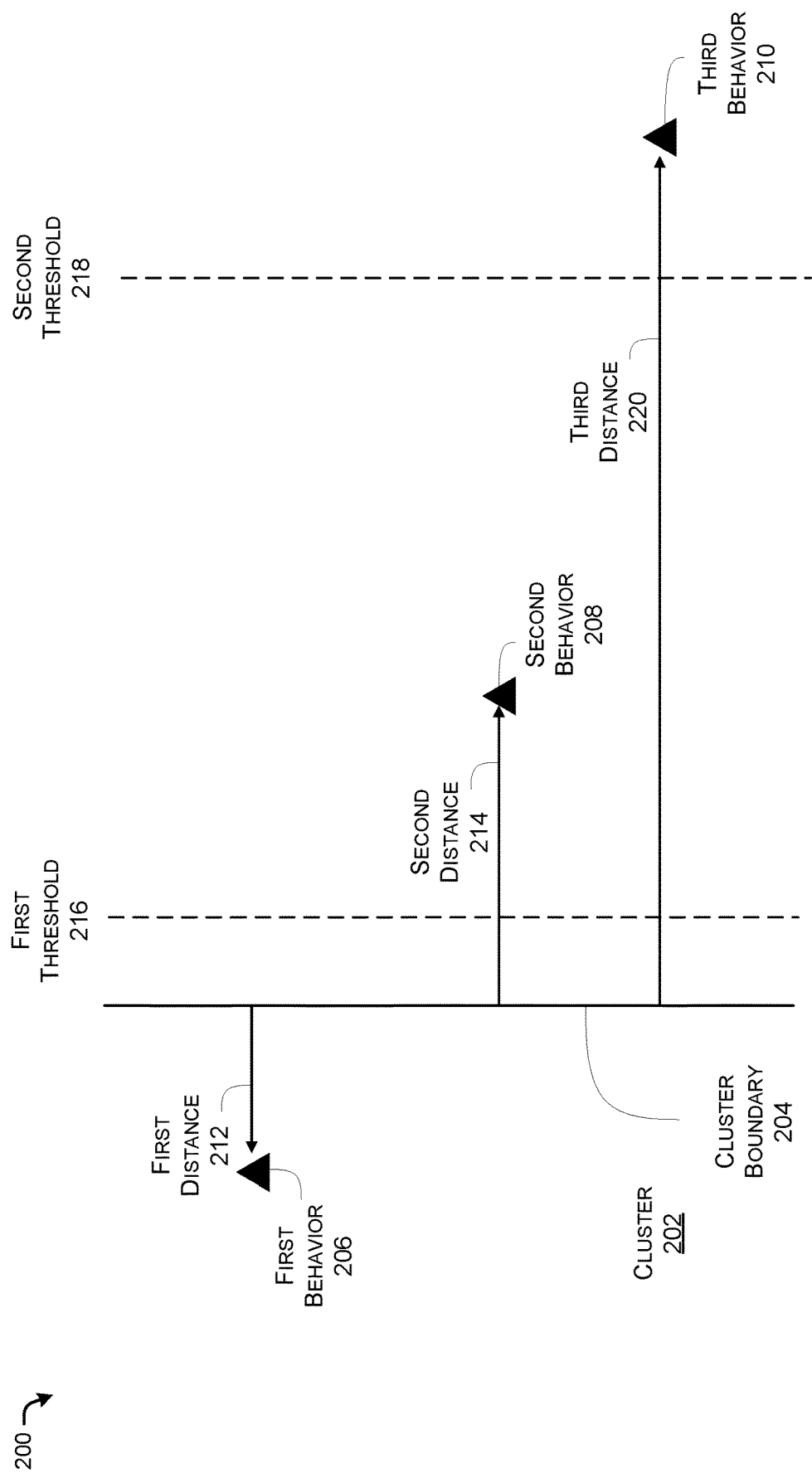
FIG. 2 illustrates an example behavior space used to identify anomalous behavior.

FIG. 2 illustrates an example behavior space 200 used to identify anomalous behavior. In various implementations, the behavior space 200 includes a cluster 202. The cluster 202, for instance, is defined based on a group of behaviors of a group within an organization. For instance, the behavior space 200 could be the behavior space 132 described above with reference to FIG. 1 and the cluster 202 could be the first cluster 138 described above with reference to FIG. 1.

In various cases, the cluster 202 is outlined by a cluster boundary 204. The cluster 202 and cluster boundary 204 can be defined according to one or more clustering techniques. In some cases, each behavior within the cluster 202 is within or continuous with the cluster boundary 204. In some examples, one or more behaviors within the cluster 202 are outside of the cluster boundary 204.

A device associated with and/or an individual within the group may have a first behavior 206, a second behavior 208, and a third behavior 210. The first behavior 206, the second behavior 208, and the third behavior 210 may be represented within the behavior space 200. For example, if the behavior space 200 is an n-dimensional space, then the first behavior 206, the second behavior 208, and the third behavior 210 are each defined according to n dimensions and represented as points within the behavior space 200.

The first behavior 206 is within the cluster 202. Therefore, a first distance 212 between the cluster boundary 204 and the first behavior 206 may be negative. In various cases, a detector may determine that the first behavior 206 is non-anomalous with respect to the group due to the negative first distance 212. In some cases, a monitor may ease or maintain a security policy associated with the device or the user based on the detector determining that the first behavior 206 is non-anomalous.

The second behavior 208 is outside of the cluster 204. In particular, a second distance 214 between the cluster boundary 204 and the second behavior 208 is positive. Therefore, the detector may determine that the second behavior 208 is anomalous and may cause the monitor to escalate a security policy of the device. In various cases, the monitor escalates the security policy of the device in a manner that is proportional to the magnitude of the second distance 214. For example, the monitor may reduce a reauthentication interval of the device in a manner inversely proportional to the magnitude of the second distance 214. In some cases, the detector determines that the second distance 214 is greater than a first threshold 216, but not a second threshold 218. Based on the detector comparing the second distance 214 to the first threshold 216 and the second threshold 218, the monitor may escalate the security policy. For example, the monitor may utilize a firewall to block the device from accessing one or more first websites and/or one or more first resources of the organization. In some instances, the monitor may utilize an authenticator to request a first type of authentication factor (e.g., a pin) during a reauthentication of the device, to request an additional authentication factor (e.g., a pin and a password), to request an authentication factor from a primary device (e.g., from the device being used to access a secured resource), or any combination thereof.

The third behavior 210 is also outside of the cluster 204, and is a third distance 220 from the cluster boundary 204. The detector may determine that the third behavior 210 is anomalous due to the third distance 220. The third distance 220 is greater than the second distance 214. In various implementations, the monitor escalates the security policy in a manner proportional to the third distance 220. For instance, the monitor may reduce the reauthentication interval in a manner inversely proportional to the magnitude of the third distance 220. That is, the reauthentication interval in response to the third behavior 210 may be even shorter than the reauthentication interval in response to the second behavior 208. Thus, the security policy may scale with the magnitude of the third distance 220. Further, the detector may determine that the third distance 220 is greater than both the first threshold 216 and the second threshold 216, and cause the monitor to escalate the security policy based on the comparison. For example, the monitor may utilize the firewall to block the device from accessing one or more first websites as well as one or more second websites and also one or more first resources and one or more second resources of the organization. In some instances, the monitor may utilize an authenticator to request a second type of authentication factor (e.g., a biometric factor) during a reauthentication of the device, to request an additional authentication factor (e.g., the biometric factor and push notification-requested message), to request an authentication factor from a primary device (e.g., from the device being used to access a secured resource) as well as a secondary device (e.g., from a mobile device associated with the user), or any combination thereof. Thus, in various cases, the monitor can scale the security policy of the device based on how anomalous the behavior associated with the device (or the device's user) is determined to be.

Figure 3:
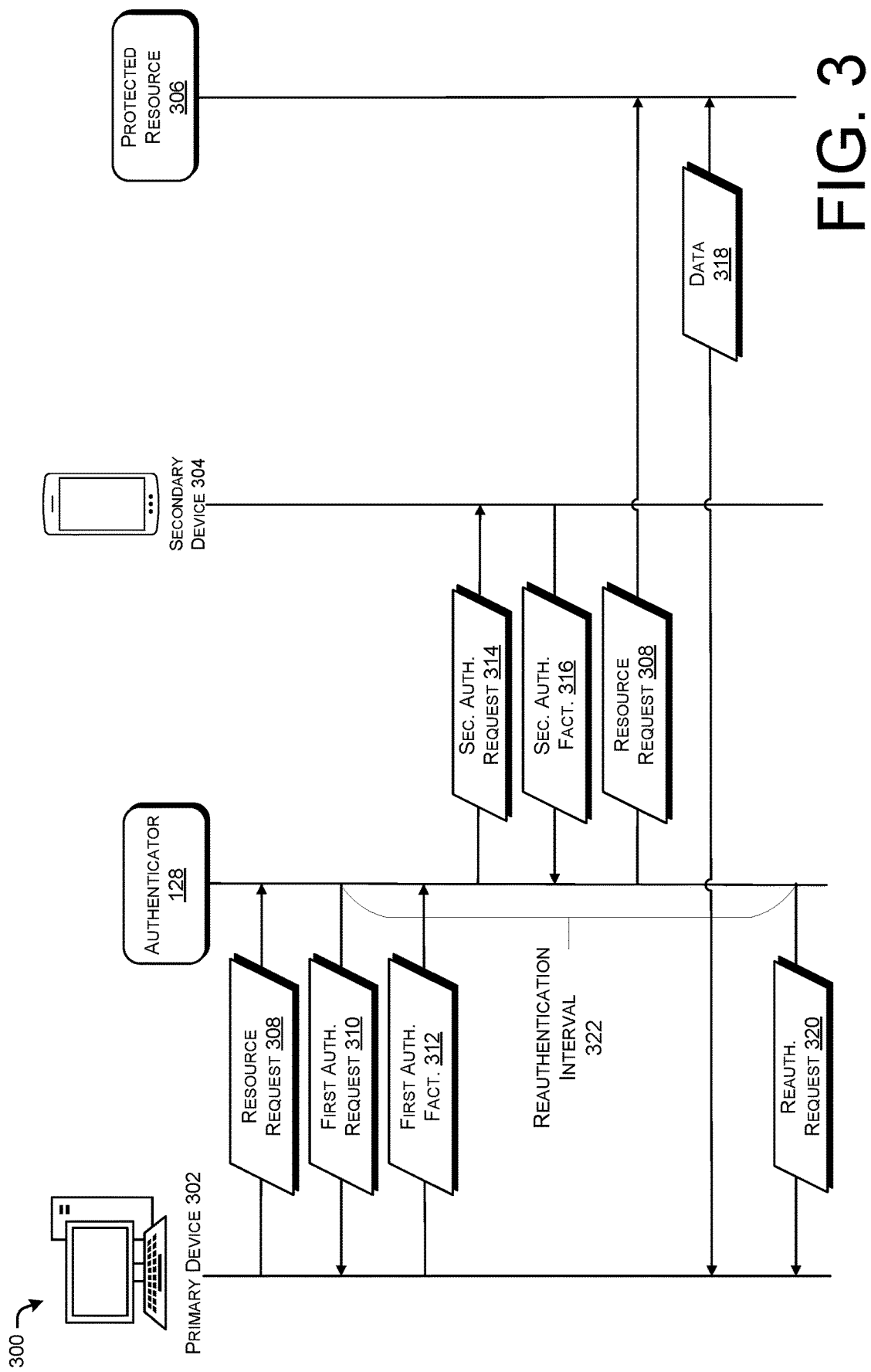
FIG. 3 illustrates example signaling associated with authenticating and reauthenticating a device in accordance with implementations of the present disclosure.

FIG. 3 illustrates example signaling 300 associated with authenticating and reauthenticating a device in accordance with implementations of the present disclosure. The signaling 300 is between the authenticator 128 described above with reference to FIG. 1, as well as a primary device 302, a secondary device 304, and a protected resource 306. In some cases, the primary device 302 is the monitored device 102 described above with reference to FIG. 1, and the protected resource 306 is part of the first resource(s) 122 or second resource(s) 124 described above with reference to FIG. 1.

In various implementations, the authenticator 128 is configured to authenticate the primary device 302 or a user of the primary device 302. The primary device 302 may transmit a resource request 308 that is received by the authenticator 128. In various cases, the resource request 308 is a request to access, retrieve, or modify data in the protected resource 306. The authenticator 128 may be in-line between the primary device 302 and the protected resource 308. For example, the authenticator 128 may be at least a part of a node along a path between the primary device 302 and the protected resource 306 through a communication network. Thus, the authenticator 128 may intercept or otherwise receive the resource request 308.

In response to receiving the resource request 308, the authenticator 128 may transmit a first authentication request 310 to the primary device 302. The first authentication request 310 is a request for a first authentication factor 312 from the primary device 302 or the user of the primary device 302. The first authentication factor 312 may be used to confirm that the user of the primary device 302 is authorized.

Authentication factors, in some cases, include codes that are known to the authorized user of the primary device 302. As used herein, the term "code," and its equivalents, can refer to a predetermined combination of alphanumeric characters and/or pixels. A password is an example of a code that can be used as an authentication factor. Other examples of codes include usernames, personal identification numbers (PINs), employee numbers, social security numbers (SSNs), driver's license numbers, Quick Response (QR) codes, and the like.

Examples of authentication factors include evidence of possession of an object associated with the authorized user. In some implementations, authentication factors may include evidence of possession of a card, a physical key, a Universal Serial Bus (USB) drive, or the like. For example, the primary device 302 may include a scanner that is configured to scan a code or chip integrated into the card, key, or USB stick.

Certain authentication factors include evidence that a device has a particular context associated with the authorized user, such as whether the device is in a particular location associated with the authorized user. For example, an authentication factor may be evidence that the primary device 302 is located in a predetermined location or a building associated with a home or workplace of the authorized user. In some cases, the primary device 302 selfreports its location. For example, the primary device 102 may receive signals from multiple satellites (e.g., Global Positioning System (GPS) satellites) and determine the location of the primary device 302 based on the signals. In some examples, authentication factor may include evidence that the primary device 302 is connected to an access point (AP) or base station associated with a particular coverage area, which may indicate that the primary device 302 is located in the coverage area.

Some authentication factors include evidence of the presence of the authorized user. In some implementations, authentication factors may be biometric factors. As used herein, the term "biometric factor," and its equivalents, can refer to evidence of the presence of a body associated with the authorized user. For example, a biometric factor may refer to data indicative of the authorized user speaking (e.g., an audible password), data indicative of a fingerprint of the authorized user (e.g., a fingerprint scan), data indicative of an eye of the authorized user (e.g., an iris or retina scan), data indicative of a face of the user (e.g., a facial scan), data indicative of a voice of the authorized user, data indicative of a physiological parameter of the authorized user, and so on. Examples of physiological parameters include a shape or presence of a portion of the body of the authorized user (e.g., a retina shape), a heart rhythm (e.g., electrocardiogram (ECG)) of the authorized user, a blood oxygenation (e.g., pulse oximetry and/or regional oximetry reading) of the authorized user, an electroencephalogram (EEG) pattern of the authorized user, a pulse rate of the authorized user, a body temperature of the authorized user, a blood pressure of the authorized user, and the like. The authenticator 128 may recognize a biometric factor by performing techniques such as voice recognition, fingerprint recognition, facial recognition, physiological parameter recognition, and the like.

In response to the first authentication request 310, the primary device 302 may transmit an the first authentication factor 312 to the authenticator 128. In various cases, the authenticator 128 may compare the first authentication factor 312 to a predetermined authentication factor. In some cases, the predetermined authentication factor is stored in a database. In various examples, the authenticator 128 determines that the first authentication factor 312 matches the predetermined authentication factor.

The authenticator 128 further transmits a second authentication request 314 to the secondary device 304. The second authentication request 314 is a request for a second authentication factor 316 from the secondary device 304 or the user of the secondary device 304. In various cases, the same authorized user is associated with the primary device 302 and the secondary device 304. In some cases, for instance, the primary device 302 is a laptop utilized by the user and the secondary device 304 is a mobile device utilized by the user. The second authentication factor 316 may be used to confirm that the authorized user of the primary device 302 is the current user operating the primary device 302. The first authentication factor 312 may be different than the second authentication factor 316. For instance, the first authentication factor 312 may be a password and the second authentication factor 316 may be a confirmation of a push notification sent to the secondary device 304.

In various cases, the secondary device 304 transmits the second authentication factor 316 to the authenticator 128. The authenticator 128 may compare the second authentication factor 316 to another predetermined authentication factor, which may also be stored in the database. In various cases, the authenticator 128 determines that the second authentication factor 316 matches the other predetermined authentication factor. Thus, the authenticator 128 may confirm that the authorized user is operating the primary device 302. That is, the authenticator 128 has now authenticated the user of the primary device 302 and/or the primary device 302 itself.

Once the user and/or primary device 302 has been authenticated, the authenticator 128 may release the resource request 308. In various cases, the authenticator 128 may transmit the resource request 308 to the protected resource 306. Based on the resource request 308, data 318 may be transmitted between the primary device 302 and the protected resource 306. Although illustrated in FIG. 3 as bidirectional, in some cases, the data 318 is transmitted unidirectionally between the primary device 302 and the protected resource 306. Further, in some cases, the resource request 308 may be part of the data 318.

The authenticator 128 may subsequently at least attempt to reauthenticate the primary device 302. For instance, the authenticator 128 may transmit a reauthentication request 320 to the primary device 302. In some cases, the authenticator 128 may disconnect the primary device 302 from the protected resource 306, such that the transmission of the data 318 is halted, before transmitting the reauthentication request 320.

A time period between the transmission of the first authentication request 310 and the reauthentication request 320 may be defined as a reauthentication interval 322. According to various implementations of the present disclosure, the authenticator 128 may change a length of the reauthentication interval 322 based on the behavior of the primary device 302. For example, if a detector determines that at least one behavior of the primary device 302 is within a cluster associated with a group of individuals including the authorized user of the primary device 302, the authenticator 128 may lengthen the reauthentication interval 322 or keep the reauthentication interval 322 at a default length. However, if the detector determines that at least one behavior of the primary device 302 is outside of the cluster associated with the group, the authenticator 128 may shorten the reauthentication interval 322 (e.g., to be shorter than the default length). In some cases, the detector shortens the reauthentication interval 322 by an amount that is based on a distance between the at least one behavior and the cluster.

The reauthentication request 320, for example, may be a request for the first authentication factor 312, the second authentication factor 316, one or more third authentication factors, or any combination thereof. In various cases, the type and/or number of authentication factors requested in the reauthentication request 320 is determined by the authenticator 128 based on at least one behavior of the primary device 302. For example, if the at least one behavior of the primary device 302 is within the cluster, the authenticator 128 may request the first authentication factor 312 in the reauthentication request 320. On the other hand, if the at least one behavior of the primary device 302 is outside of the cluster, the authenticator 128 may request the one or more third authentication factors, which may be different than the first authentication factor 312 and the second authentication factor 316. In some cases, the one or more third authentication factors may be more for an unauthorized user to mimic than the first authentication factor 312 or the second authentication factor 316. For instance, the reauthentication request 320 may be a request for a biometric factor of the authorized user of the primary device 302.

Figure 4:
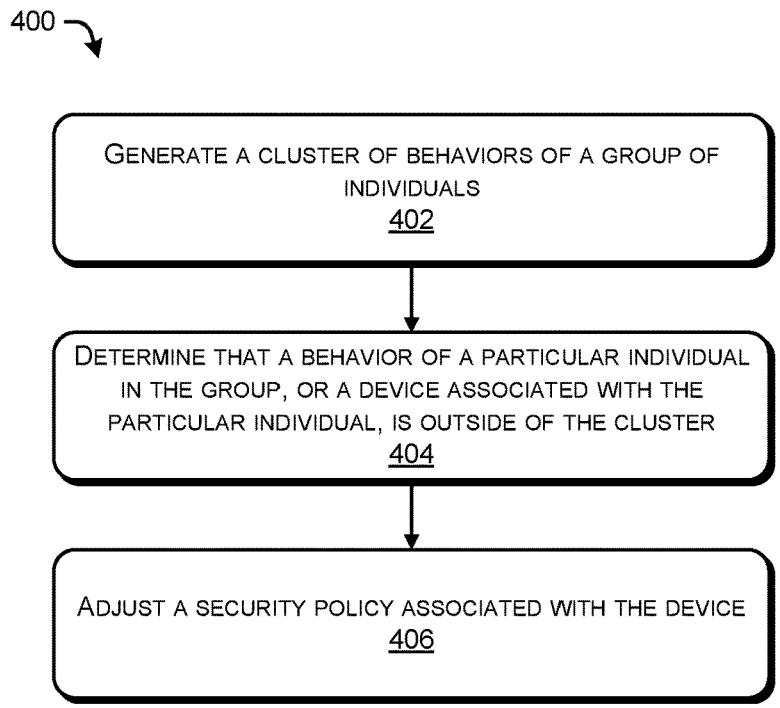
FIG. 4 illustrates an example process for adjusting a security policy based on anomaly detection.

FIG. 4 illustrates an example process 400 for adjusting a security policy based on anomaly detection. The process 400 may be performed by an entity, such as a computing device, at least one processor, the monitor 120, the detector 130, or any combination thereof.

At 402, the entity generates a cluster of behaviors of a group of individuals. In various cases, the entity identifies the behaviors of the group. For example, the entity may receive messages (e.g., requests) from devices associated with the individuals and may identify behavior associated with those messages. For instance, the behaviors may include accessing data in a remote resource, modifying data in a remote resource, transmitting data to a remote resource, or a receipt of data from a remote resource. The behaviors, in various cases, can be defined according to multiple variables, such as time, identity of the resource connected to the device, frequency of behavior, amount of data being transmitted across a communication network, location of the devices while the behaviors are performed, and so on.

In various cases, the messages indicating the behaviors are received by an in-line monitor. For example, the messages may be received by a zero trust service, a CASB, a SASE service, a network security service, a proxy, or a combination thereof. In various cases, the in-line monitor is a network node disposed along a path between the devices and the remote resource(s).

According to various implementations, the entity maps the behaviors onto a behavior space and identifies a cluster that includes the behaviors. For instance, the entity may perform k-means clustering, or some other suitable clustering technique, to identify the cluster of the behaviors. In the behavior space, the cluster may have a boundary that surrounds the behaviors. In some cases, the group is defined based on the cluster. For instance, the entity may map behaviors from a broader population of individuals, may identify the cluster of the group, and may define the group of the individuals based on the behaviors in the cluster. In some cases, the group is predetermined. For example, the individuals in the group may have at least one characteristic in common. Examples of common characteristics may include language spoken, a geographical region (e.g., city, state, country, time zone, etc.) in which the devices associated with the individuals are located, an office in which the individuals in the group work out of, a department in which the individuals in the group belong to, a business unit in which the individuals in the group belong to, a common role (e.g., job title) shared by the individuals in the group, a type of device (e.g., a device manufacturer) or software (e.g., operating system) utilized by all of the individuals, a shared interest of the individuals, a demographic (e.g., age) shared by the individuals in the group, or the like. According to some cases, the group of the individuals are within an organization that includes a broader population of people than the individuals within the group. For instance, the group may be one of multiple groups within the organization.

At 404, the entity determines that a behavior of a particular individual within the group, or a device associated with the particular individual, is outside of the cluster. In various cases, the entity maps the behavior in the behavior space and compares the behavior to the cluster. In various implementations, the behavior of the particular individual is a distance from the boundary of the cluster and/or a center of the cluster.

At 406, the entity adjusts a security policy associated with the device. In various implementations, the entity adjusts the security policy based on the distance between the behavior of the particular individual and the boundary and/or center of the cluster. For example, the entity may escalate the security policy to a greater extent if the behavior is a long distance from the cluster, and may escalate the security policy to a lesser extent if the behavior is a short distance from the cluster. In various implementations, the security policy includes a MFA policy. For example, the entity may shorten a reauthentication interval of the device associated with the particular individual based on the length of the distance between the behavior and the cluster. In various implementations, the entity may add a new authentication factor, or include a strict authentication factor (e.g., a biometric factor), in response to determining that the distance is greater than a threshold.

Figure 5:
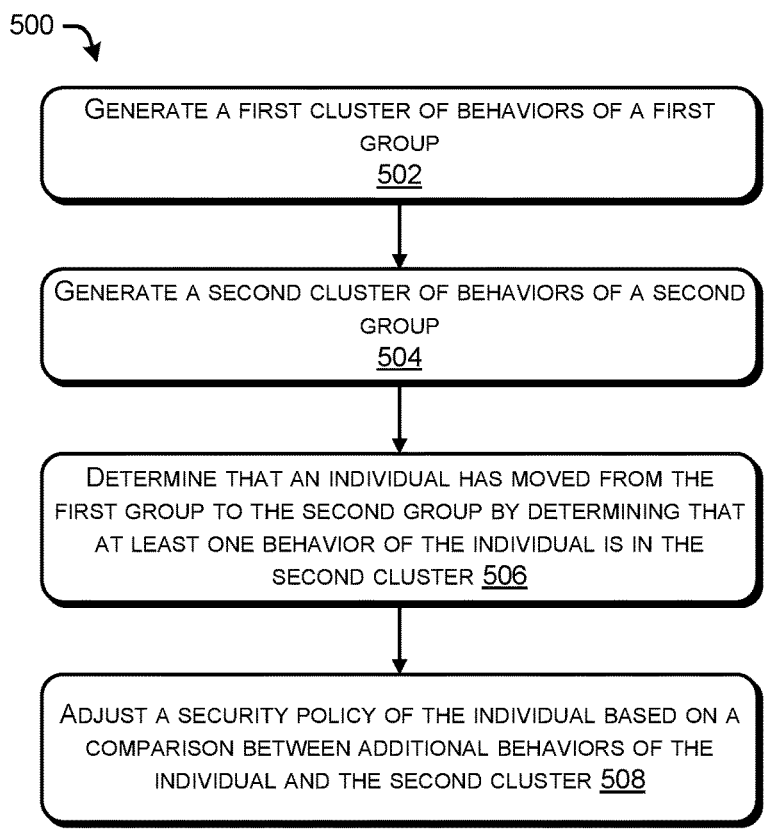
FIG. 5 illustrates an example process for detecting when an individual has moved from a first group to a second group in an organization.

FIG. 5 illustrates an example process 500 for detecting when an individual has moved from a first group to a second group in an organization. The process 500 may be performed by an entity, such as a computing device, at least one processor, the monitor 120, the detector 130, or any combination thereof.

At 502, the entity generates a first cluster of behaviors of a first group. For example, the entity may receive messages (e.g., requests) from devices associated with individuals in the first group and may identify behavior associated with those messages. For instance, the behaviors may include accessing data in a remote resource, modifying data in a remote resource, transmitting data to a remote resource, or a receipt of data from a remote resource. The behaviors, in various cases, can be defined according to multiple variables, such as time, identity of the resource connected to the device, frequency of behavior, amount of data being transmitted across a communication network, location of the devices while the behaviors are performed, and so on.

In various cases, the messages indicating the behaviors are received by an in-line monitor. For example, the messages may be received by a zero trust service, a CASB, a SASE service, a network security service, a proxy, or a combination thereof. In various cases, the in-line monitor is a network node disposed along a path between the devices and the remote resource(s).

According to various implementations, the entity maps the behaviors onto a behavior space and identifies a first cluster that includes the behaviors. For instance, the entity may perform k-means first clustering, or some other suitable first clustering technique, to identify the first cluster of the behaviors. In the behavior space, the first cluster may have a boundary that surrounds the behaviors. In some cases, the first group is defined based on the first cluster. For instance, the entity may map behaviors from a broader population of individuals, may identify the first cluster of the group, and may define the first group of the individuals based on the behaviors in the first cluster. In some cases, the first group is predetermined. For example, the individuals in the first group may have at least one characteristic in common. Examples of common characteristics may include language spoken, a geographical region (e.g., city, state, country, time zone, etc.) in which the devices associated with the individuals are located, an office in which the individuals in the group work out of, a department in which the individuals in the first group belong to, a business unit in which the individuals in the first group belong to, a common role (e.g., job title) shared by the individuals in the group, a type of device (e.g., a device manufacturer) or software (e.g., operating system) utilized by all of the individuals, a shared interest of the individuals, a demographic (e.g., age) shared by the individuals in the first group, or the like.

At 504, the entity generates a second cluster of behaviors of a second group. For example, the entity may receive messages (e.g., requests) from devices associated with individuals in the second group and may identify behavior associated with those messages. For instance, the behaviors may include accessing data in a remote resource, modifying data in a remote resource, transmitting data to a remote resource, or a receipt of data from a remote resource. The behaviors, in various cases, can be defined according to multiple variables, such as time, identity of the resource connected to the device, frequency of behavior, amount of data being transmitted across a communication network, location of the devices while the behaviors are performed, and so on. In various cases, the messages indicating the behaviors are received by the in-line monitor.

According to various implementations, the entity maps the behaviors onto the behavior space and identifies a second cluster that includes the behaviors. For instance, the entity may perform k-means second clustering, or some other suitable second clustering technique, to identify the second cluster of the behaviors. In the behavior space, the second cluster may have a boundary that surrounds the behaviors. In some cases, the second group is defined based on the second cluster. For instance, the entity may map behaviors from a broader population of individuals, may identify the second cluster of the group, and may define the second group of the individuals based on the behaviors in the second cluster. In some cases, the second group is predetermined. For example, the individuals in the second group may have at least one characteristic in common. Examples of common characteristics may include language spoken, a geographical region (e.g., city, state, country, time zone, etc.) in which the devices associated with the individuals are located, an office in which the individuals in the group work out of, a department in which the individuals in the second group belong to, a business unit in which the individuals in the second group belong to, a common role (e.g., job title) shared by the individuals in the group, a type of device (e.g., a device manufacturer) or software (e.g., operating system) utilized by all of the individuals, a shared interest of the individuals, a demographic (e.g., age) shared by the individuals in the second group, or the like.

The first group and the second group may be within the same organization. However, the individuals within the first group may be different than the individuals within the second group. In various implementations, the first cluster is distinct from the second cluster in the behavior space.

At 506, the entity determines that an individual has moved from the first group to the second group by determining that at least one behavior of the individual is in the second cluster. In various implementations, the behavior(s) is outside of the first cluster, but within the boundary of the second cluster. The entity may determine that the individual has moved from the first group to the second group by determining that greater than a threshold of behaviors of the individual are within the second cluster. In some cases, upon determining that the individual has shifted groups, the entity may output a notification to an external device that indicates the shift. Due to the shift, the entity may refrain from outputting an alert if subsequent behavior of the individual is outside of the first cluster, particularly if the subsequent behavior is within the second cluster.

At 508, the entity adjusts a security policy of the individual based on a comparison between additional behaviors of the individual and the second cluster. In various implementations, the entity determines distances between the additional behaviors and the center and/or boundary of the second cluster. The entity may adjust a security policy of the individual based on the distances. For example, the entity may adjust a firewall rule and/or MFA policy associated with the individual and/or the device associated with the individual.

Figure 6:
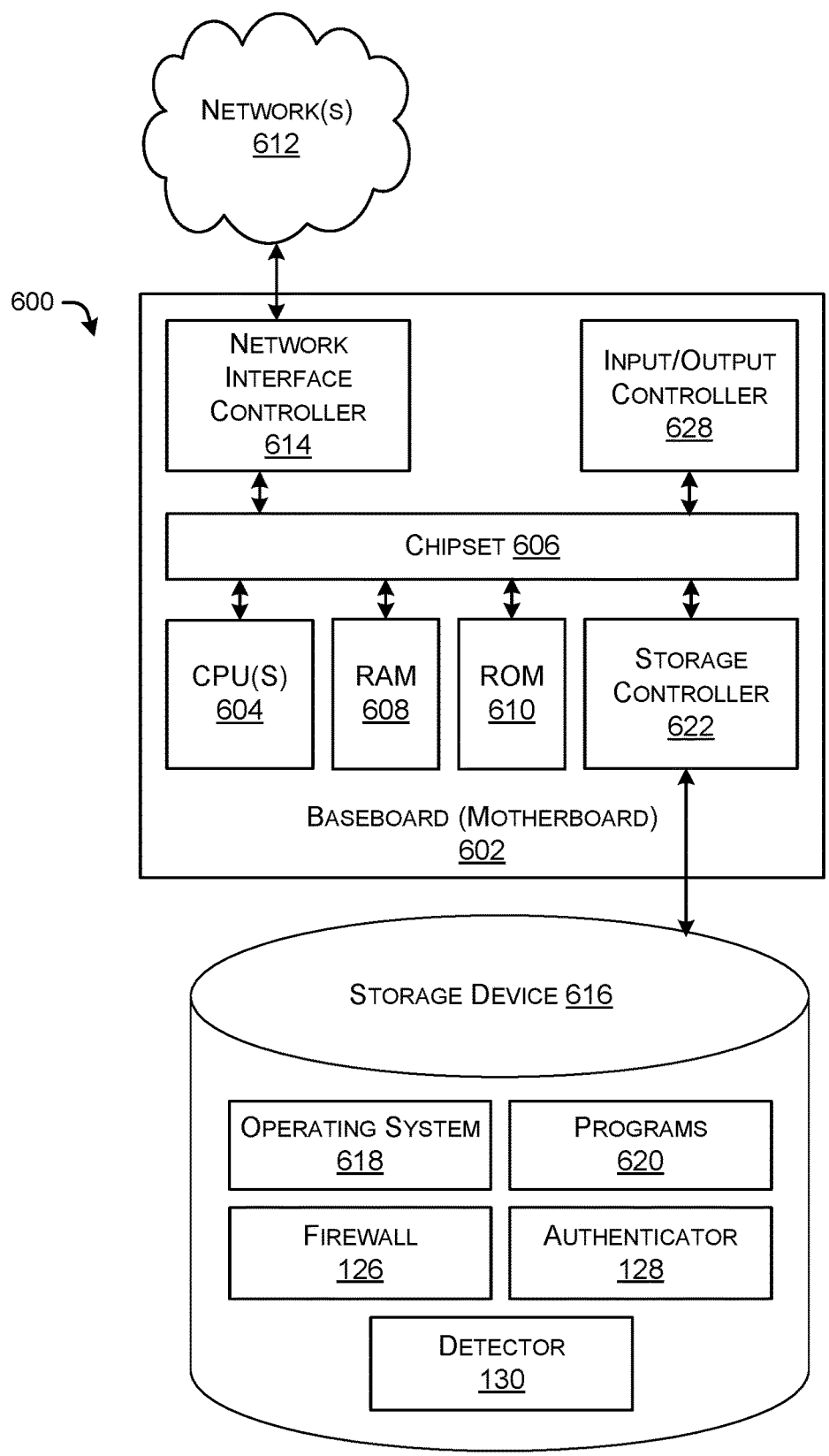
FIG. 6 shows an example computer architecture for a server computer capable of executing program components for implementing the functionality described herein.

FIG. 6 shows an example computer architecture for a server computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 600 may, in some examples, correspond to a network node (e.g., the monitor 120) described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a random-access memory (RAM) 608, used as the main memory in the computer 600. The chipset 606 can further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as at least one network 612. The chipset 606 can include functionality for providing network connectivity through a network interface controller (NIC) 614, such as a gigabit Ethernet adapter. The NIC 614 is capable of connecting the computer 600 to other computing devices over the network(s) 612. It should be appreciated that multiple NICs 614 can be present in the computer 600, connecting the computer 600 to other types of networks and remote computer systems. In some instances, the NICs 614 may include at least on ingress port and/or at least one egress port.

The computer 600 can be connected to a storage device 616 that provides non-volatile storage for the computer. The storage device 616 can store an operating system 618, programs 620, and data, which have been described in greater detail herein. The storage device 616 can be connected to the computer 600 through a storage controller 622 connected to the chipset 606. The storage device 616 can consist of one or more physical storage units. The storage controller 616 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 600 can store data on the storage device 616 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 616 is characterized as primary or secondary storage, and the like.

For example, the computer 600 can store information to the storage device 616 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 616 by detecting the physical states or characteristics of one or more particular locations within the physical storage units.

In addition to the mass storage device 616 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by any network node described herein may be supported by one or more devices similar to computer 600. Stated otherwise, some or all of the operations performed by a network node may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 616 can store an operating system 618 utilized to control the operation of the computer 600. According to one embodiment, the operating system comprises the LINUX™ operating system. According to another embodiment, the operating system includes the WINDOWS™ SERVER operating system from MICROSOFT Corporation of Redmond, Washington. According to further embodiments, the operating system can comprise the UNIX™ operating system or one of its variants. It should be appreciated that other operating systems can also be utilized. The storage device 616 can store other system or application programs and data utilized by the computer 600.

In one embodiment, the storage device 616 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

As illustrated in FIG. 6, the storage device 616 stores programs 620, which may include one or more processes, as well as instructions for executing the firewall 126, the authenticator 128, and the detector 130 described above. The process(es) may include instructions that, when executed by the CPU(s) 604, cause the computer 600 and/or the CPU(s) 604 to perform one or more operations.

The computer 600 can also include one or more input/output controllers 628 for receiving and processing input from a number of input devices, such as a keyboard, a mouse, a touchpad, a touch screen, an electronic stylus, or other type of input device. Similarly, an input/output controller 628 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
identifying first behaviors associated with a first user;
identifying a first cluster comprising the first behaviors and second behaviors associated with at least one second user, the first user and the at least one second user being in a predetermined group within an organization;
identifying third behaviors associated with a device of the first user;
determining that at least one of the third behaviors is greater than a threshold distance from the first cluster;
identifying a second cluster comprising fourth behaviors associated with at least one third user and greater than a threshold distance of the third behaviors, the at least one third user being in a second predetermined group in the organization;
based on identifying the second cluster, determining that the first user has transitioned from the first predetermined group to the second predetermined group within the organization; and
outputting an indication that the first user has joined the second predetermined group.

2. The method of claim 1, the device being a first device, wherein the first behaviors comprise at least one of:
a request to access first data in a first resource;
a request to modify second data in a second resource;
a transmission of third data from the first device to a second device; or
a receipt of fourth data from the second device to the first device.

3. The method of claim 1, the device being a first device, wherein identifying the first behaviors associated with the first user is performed by an in-line monitor and comprises:
receiving, from the first device and by the in-line monitor, a request to access or modify data stored by a second device.

4. The method of claim 3, wherein the in-line monitor comprises a zero trust service, a cloud access security broker (CASB), a secure access service edge (SASE) service, a network security service, or a proxy, the in-line monitor being a network node disposed on a path between the first device and the second device.

5. The method of claim 1, wherein the first predetermined group within the organization comprises first individuals working in a first single office of the organization, and
wherein the second predetermined group within the organization comprises second individuals working in a second single office of the organization.

6. The method of claim 1, wherein determining that at least one of the third behaviors is greater than the threshold distance from the first cluster comprises:
identifying a distance between the at least one of the third behaviors and a center or boundary of the cluster; and
determining that the distance is greater than the threshold distance.

7. The method of claim 1, further comprising:
in response to determining that at least one of the third behaviors is greater than a threshold distance from the first cluster and determining that the first user has transitioned from the first predetermined group to the second predetermined group, refraining from escalating a security policy associated with the device.

8. The method of claim 1, further comprising:
in response to determining that the first user has transitioned from the first predetermined group to the second predetermined group:
identifying a fifth behavior associated with the first user;
determining that the fifth behavior is greater than a threshold distance from the second cluster; and
based on determining that the fifth behavior is greater than the threshold distance from the second cluster, outputting an alert.

9. The method of claim 8, wherein the fifth behavior is in the first cluster.

10. The method of claim 1, wherein the first predetermined group comprises first individuals that share a first language, and
wherein the second predetermined group comprises second individuals that share a second language.

11. The method of claim 1, wherein the first predetermined group comprises first individuals with a same first role in the organization, and
wherein the second predetermined group comprises second individuals with a same second role in the organization.

12. A system, comprising:
at least one processor; and
one or more non-transitory media storing instructions that, when executed by the system, cause the system to perform operations comprising:
identifying first behaviors associated with a first user;
identifying a first cluster comprising the first behaviors and second behaviors associated with at least one second user, the first user and the at least one second user being in a first predetermined group within an organization;
identifying third behaviors associated with a device of the first user;
determining that at least one of the third behaviors is greater than a threshold distance from the first cluster;
identifying a second cluster comprising fourth behaviors associated with at least one third user and greater than a threshold distance of the third behaviors, the at least one third user being in a second predetermined group in the organization;
based on identifying the second cluster, determining that the first user has transitioned from the first predetermined group to the second predetermined group within the organization; and
outputting an indication that the first user has joined the second predetermined group.

13. The system of claim 12, the device being a first device, wherein the first behaviors comprise at least one of:
a request to access first data in a first resource;
a request to modify second data in a second resource;
a transmission of third data from the first device to a second device; or
a receipt of fourth data from the second device to the first device.

14. The system of claim 12, the device being a first device, wherein identifying the first behaviors associated with the first user is performed by an in-line monitor and comprises:
receiving, from the first device and by the in-line monitor, a request to access or modify data stored by a second device.

15. The system of claim 14, wherein the in-line monitor comprises a zero trust service, a CASB, a SASE service, a network security service, or a proxy, the in-line monitor being a network node disposed on a path between the first device and the second device.

16. The system of claim 12, wherein the first predetermined group within the organization comprises first individuals working in a first single department of the organization, and
wherein the second predetermined group within the organization comprises second individuals working in a second single department of the organization.

17. The system of claim 12, wherein determining that at least one of the third behaviors is greater than the threshold distance from the cluster comprises:
identifying a distance between the at least one of the third behaviors and a center or boundary of the cluster; and
determining that the distance is greater than the threshold distance.

18. An in-line monitor, comprising:
at least one processor; and
memory storing instructions that, when executed by the at least one processor, cause the in-line monitor to perform operations comprising:
receiving first requests from a first device associated with a first user, the first requests being to access one or more first resources;
identifying a first cluster comprising first behaviors indicated by the first requests and second behaviors associated with at least one second user by performing k-means clustering on the first behaviors and the second behaviors, the first user and the at least one second user being in a first predetermined group within an organization;
receiving a second request from the first device, the second request being to access a second resource;
determining a distance between a third behavior associated with the second request and a boundary of the cluster; and
adjusting a reauthentication interval associated with the first device based on the distance between the third behavior associated with the second request and the boundary of the cluster;
identifying a second cluster comprising fourth behaviors associated with third users, the third users being in a second predetermined group within the organization;
identifying fifth behaviors associated with the first device;
determining that at least one of the fifth behaviors is greater than a threshold distance from the first cluster;
determining that greater than a threshold number of the fifth behaviors is within the second cluster; and
based on determining that greater than the threshold number of the fifth behaviors is within the second cluster, outputting a notification indicating that the first user has moved from the first predetermined group to the second predetermined group.

19. The in-line monitor of claim 18, wherein the first behaviors indicate at least one location of the one or more first resources, at least one time at which the first requests occur, at least one network connected to the first device when the first requests occur, a number of the first requests, and a frequency of the first requests.

20. The in-line monitor of claim 18, wherein the operations further comprise:
determining that the distance between the third behavior associated with the second request and the boundary of the cluster is greater than a predetermined threshold;
based on determining that the distance between the third behavior associated with the second request and the boundary of the cluster is greater than the predetermined threshold, determining that the reauthentication interval has expired;
based on determining that the reauthentication interval has expired, requesting a biometric factor from the first device;
receiving the biometric factor from the first device;
requesting an additional authentication factor from the first device;
receiving the additional authentication factor from the first device; and
based on receiving the biometric factor and the authentication factor, enabling the first device to access the second resource.

* * * * *